United States Patent [19]

Fischer et al.

[11] Patent Number: 4,953,771
[45] Date of Patent: Sep. 4, 1990

[54] DRAWER MOUNTED CUP HOLDER

[75] Inventors: Douglas A. Fischer, Grand Rapids; Joseph S. Meinke, Rockford, both of Mich.

[73] Assignee: Lescoa, Inc., Kentwood, Mich.

[21] Appl. No.: 316,971

[22] Filed: Feb. 28, 1989

[51] Int. Cl.$^5$ ............... A47B 37/00; F16M 13/00; A47C 7/62

[52] U.S. Cl. ............... 224/273; 224/275; 224/281; 224/282; 224/42.43; 297/194; 211/71; 211/79; 211/81; 108/44; 248/311.2

[58] Field of Search ........... 224/273, 275, 281, 282, 224/42.41, 42.42, 42.43, 42.44, 42.45 R; 108/44, 45, 46, 26, 33; 297/194; 211/71, 85, 75, 78, 79, 80, 81, 82; 248/311.2, 318

[56] References Cited

U.S. PATENT DOCUMENTS

| | | | |
|---|---|---|---|
| 2,546,459 | 3/1951 | Lee | 108/28 |
| 2,634,181 | 4/1953 | Hunt | 108/33 |
| 2,654,616 | 10/1953 | Mockli | 280/751 |
| 2,772,934 | 12/1956 | Eraut | 108/45 |
| 2,825,611 | 3/1958 | Aynesworth | 108/45 |
| 2,845,315 | 7/1958 | McCoy | 108/33 |
| 3,039,616 | 6/1962 | Proffit | 108/46 U X |
| 3,190,241 | 6/1965 | Rodgers et al. | 108/46 |
| 3,606,112 | 9/1971 | Cheshier | 224/42.44 |
| 3,637,184 | 1/1972 | O'Brien | 297/194 X |
| 3,859,931 | 1/1975 | Lalonde | 108/44 |
| 3,899,982 | 8/1975 | Fetzek | 108/25 |
| 4,286,742 | 9/1981 | Pellegrino | 224/281 |
| 4,417,764 | 11/1983 | Marcus et al. | 297/194 |
| 4,511,072 | 4/1988 | Owens | 224/275 |
| 4,530,480 | 7/1985 | Pratt | 248/311.2 |
| 4,645,157 | 2/1987 | Parker | 248/311.2 |
| 4,728,018 | 3/1988 | Parker | 224/273 |
| 4,733,908 | 3/1988 | Dykstra et al. | 297/194 |
| 4,738,423 | 4/1988 | DiFilippo et al. | 248/311.2 |
| 4,756,572 | 7/1988 | Dykstra et al. | 297/194 |
| 4,759,584 | 7/1988 | Dykstra et al. | 297/194 |
| 4,792,174 | 12/1988 | Shioda | 224/42.42 |
| 4,819,843 | 4/1989 | Nakayama | 224/42.45 R |
| 4,826,058 | 5/1989 | Nakayama | 224/42.44 |
| 4,828,211 | 5/1989 | McConnell et al. | 248/311.2 |

Primary Examiner—Ernest G. Cusick
Attorney, Agent, or Firm—Varnum, Riddering, Schmidt & Howlett

[57] ABSTRACT

A pivoting cup holder for supporting a beverage container in a vehicle. The cup holder comprises a flat movable drawer which can slide into and out of a retainer set into or below the dashboard or an armrest of an automobile. A semicircular indentation is formed in each side of the drawer. Pivotally mounted to the drawer are a pair of cup rings, each of which is formed with a curved edge complementary to the semicircular indentation. The cup rings are spring-loaded to rotate horizontally to a use position when the drawer is pulled outwardly of the retainer. In the use position the cup rings cooperate with the semicircular indentation to form complete circular retainers for supporting the side wall of a beverage container. The cup holder further comprises a spring loaded bail and cup support which, when the drawer is opened, vertically pivot to a position centered below the circular retainers to brace the bottom surface of the beverage container. When the drawer is moved to a closed position the cup rings pivot to a location in which they overlap with each other and with the semicircular indentations. The bail and cup support similarly pivot to a position in which the cup support projects through the semicircular indentations in the drawer.

12 Claims, 3 Drawing Sheets

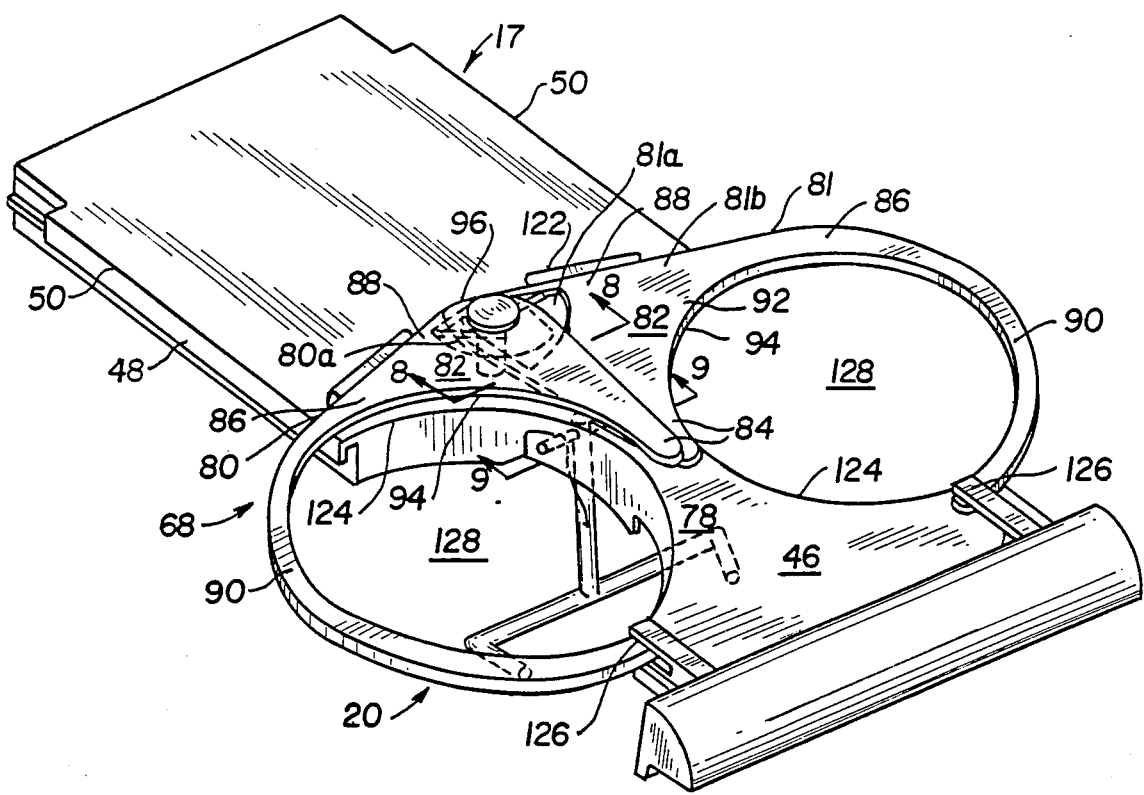
FIG. 7
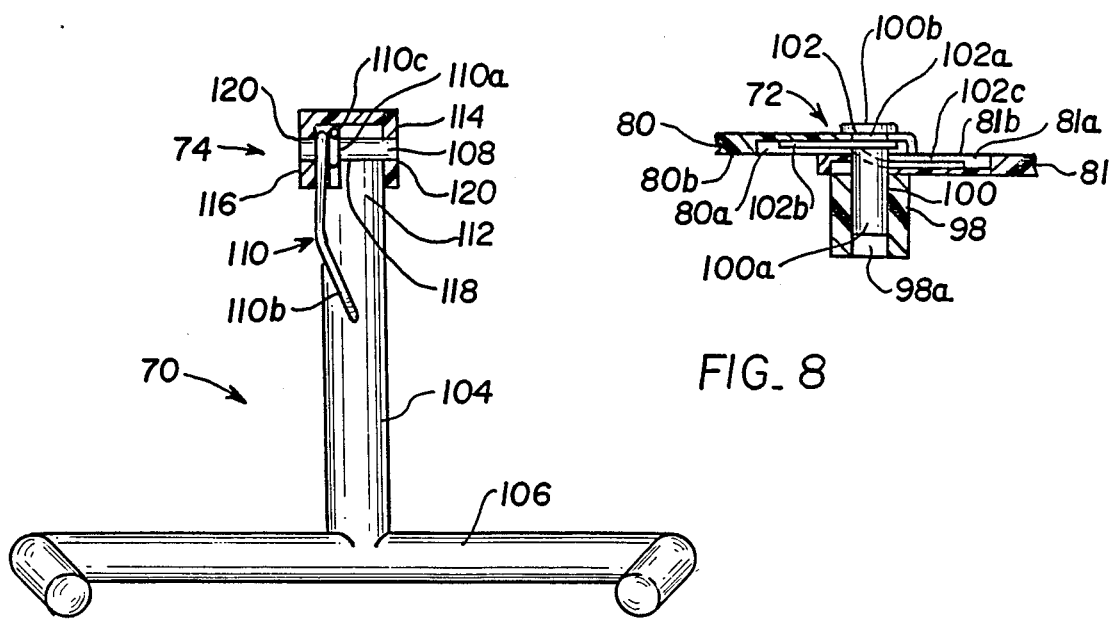
FIG. 8
FIG. 9

DRAWER MOUNTED CUP HOLDER

BACKGROUND OF THE INVENTION

1. Field of the Invention

The invention relates generally to beverage container holders and, more particularly, to a compact cup holder adapted to be used in an automobile wherein curved cup rings mounted to a slidable drawer are pivoted to an open position in which they cooperate with semicircular openings in the drawer to form complete circular retainers for a beverage container, and wherein a cup supporting member is pivoted to a position centered below the complete circular retainers to support the bottoms of beverage containers received in the circular openings.

2. Description of the Related Art

Individuals traveling by automobile or other motor vehicle frequently find it useful or enjoyable to consume a beverage while en route. Such travelers may carry with them individual bottles or cans of their favorite refreshment. More frequently, travelers will utilize the convenient services of restaurant "drive-thrus" at which they typically receive their beverages in cups of expanded polystyrene foam or paper. However, the individual cans, bottles or cups which one receives when a carry-out beverage is ordered are typically small, light in weight, and easily upset or spilled when set down on a seat or the floor of a vehicle. Obviously, this is to be avoided as the spilled liquid may soil the interior of the vehicle as well as the clothes and personal possessions of the vehicle's occupants.

Consequently, a number of devices have been developed for retaining and supporting beverage containers used in automobiles. U.S. Pat. No. 4,511,072, entitled Drinking Cup Holder for Automobiles and issued Apr. 16, 1985 to Owens, discloses a folding cup holder which may be stored in the glove compartment when not in use and which further includes magnets for securing the cup holder to an appropriate metal surface. This device is obviously limited in use, because a suitable mounting surface may not be within easy reach of the user.

Several prior patents disclose trays which may be slidably mounted below an automobile dashboard for movement between a retracted storage position below the dashboard and an extended position of use above or close to the leading edge of the front passenger seat. Such trays may be provided with fixed circular apertures for receiving beverage containers. Examples of these devices are disclosed in U.S. Pat. No. 2,825,611, entitled Tray for Automobiles and Other Similar Vehicles and issued Mar. 4, 1958 to Aynesworth, U.S. Pat. No. 3,606,112, entitled Retractable Beverage Holder for Motor Vehicles and issued Sept. 20, 1971 to Cheshire, and U.S. Pat. No. 3,899,982, entitled Pull Out Table for Attachment Beneath an Automobile Dashboard and issued Aug. 19, 1975 to Fetzek.

Other references disclose trays which may be swingably mounted below an automobile dashboard for movement between a storage position below the dashboard and a position of use extending from the dashboard toward the seat. These trays also may be provided with fixed circular apertures for receiving beverage containers. Examples of the latter devices are disclosed in U.S. Pat. No. 2,772,934, entitled Food Service Tray and issued Dec. 4, 1956 to Eraut, and U.S. Pat. No. 3,190,241, entitled Serving Tray for Vehicles and issued June 22, 1965 to Rodgers et. al.

U.S. Pat. No. 2,845,315, entitled Utility Shelf for an Automobile Instrument Panel and issued Jul. 29, 1958 to McCoy, discloses a shelf which is slidably mounted for movement into a recess in a dashboard for storage and for movement outwardly of the recess for use, but the shelf does not provide means for retaining a beverage container.

The prior art devices which provide specific means for supporting and retaining beverage containers disclose trays having complete and fixed circular apertures arranged in a side-by-side or front-to-back relation. This necessarily requires that the width or depth, respectively, of the tray be greater than the diameter of two beverage containers to allow enough area to enclose a pair of fixed, complete circular apertures. Such devices obviously occupy considerable space below the vehicle dashboard.

However, with the increased use of mobile telephones, citizen band radios, and other electronic equipment in automobiles, the available space below the automobile dashboard is becoming more and more limited. In addition to the foregoing electronic devices, automobiles are increasingly being outfitted with bulky standard features such as stereophonic radios, tape players, compact disc players, and air conditioning, which further limit the available space behind the dashboard for the installation of an in-dash beverage container holder. Thus, it is desirable to provide a compact beverage container holder which occupies a minimum amount of space below the dashboard or which, alternatively, can be mounted in a small recess in the automobile dashboard, in a recess in an automobile door armrest, or on the underside of a fold-down armrest of a type used to separate the two portions of a split bench style seat.

To provide maximum flexibility, a beverage container holder should include a means for supporting a bottom surface of the container. If the sole means for supporting the container is provided by circular apertures of fixed size, then many beverage containers may be either too small or too large to be adequately supported by the holder. However, the provision of a fixed means for supporting the bottom surface of a beverage container substantially increases the space occupied by the holder, which space as mentioned above is at a premium in current production automobiles. Therefore, it is also desirable to provide a compact means for supporting the bottom surface of a beverage container.

SUMMARY OF THE INVENTION

The present invention provides a cup holder for supporting at least one beverage container in a vehicle and comprising movable drawer means, fixed support means therefor, and container retaining means carried by the drawer means for movement therewith and movable relative thereto between a retaining position and a collapsed position. More particularly, the fixed support means includes means for mounting the holder in a vehicle and means for supporting the drawer means on the mounting means for reciprocating movement relative thereto between an operative position extending outwardly of the mounting means and a storage position extending inwardly relative to the mounting means. The container retaining means, being mounted on the drawer means for movement relative thereto, in its retaining position forms with the drawer means a container retaining configuration, and in its collapsed position forms with the drawer means a compact configuration occupying a space smaller than the space occupied by the container retaining configuration.

The cup holder further comprises means carried by the drawer means for biasing the container retaining means toward the retaining position. The fixed means includes cam means engageable with the container retaining means to urge the latter to the collapsed position upon movement of the drawer means from the operative position to the storage position.

In accordance with the invention, the drawer means may comprise a substantially flat horizontal drawer member formed with a pair of curved indentations at opposed lateral edge portions thereof; and the container retaining means may comprise a pair of cup rings and means for mounting the cup rings on the drawer member for pivotal movement relative thereto in opposite directions and in horizontal planes between the retaining position and the collapsed position. Each of the cup rings is formed with a curved edge complementary to one of the indentations whereby a container-receiving aperture is defined when the cup rings are in the retaining position. The biasing means may comprise a spring means interposed between the drawer member and each of the cup rings.

Each of the cup rings is preferably formed with a pivot aperture, the cup rings being partially overlapped so that the pivot apertures thereof are aligned to receive the means mounting the cup rings on the drawer member, whereby the pivotal movement of the cup rings is executed about a common vertical axis.

In preferred embodiments, the container receiving means further comprises a bail, and means for mounting the bail to a lower surface of the drawer member for pivotal movement relative to the drawer member about a horizontal axis between the retaining position and the collapsed position. In the retaining position, the bail is disposed to support the bottom of a beverage container received in either of the container-receiving apertures. The biasing means for the bail may include a torsion spring interposed between the drawer member and the bail.

BRIEF DESCRIPTION OF THE DRAWINGS

For a more complete understanding of the invention, reference should now be had to the embodiment illustrated in the accompanying drawings and described below by way of example.

In the drawings:

FIG. 7 is a perspective view of the pivoting cup holder similar to FIG. 2 but showing the pivoting cup holder removed from the retainer and the shell;

FIG. 8 is a sectional view of the first pivot means taken along lines 8—8 of FIG. 7; and FIG. 9 is a sectional view of the second pivot means taken along lines 9—9 of FIG. 7.

DETAILED DESCRIPTION OF THE INVENTION

Figure 1:
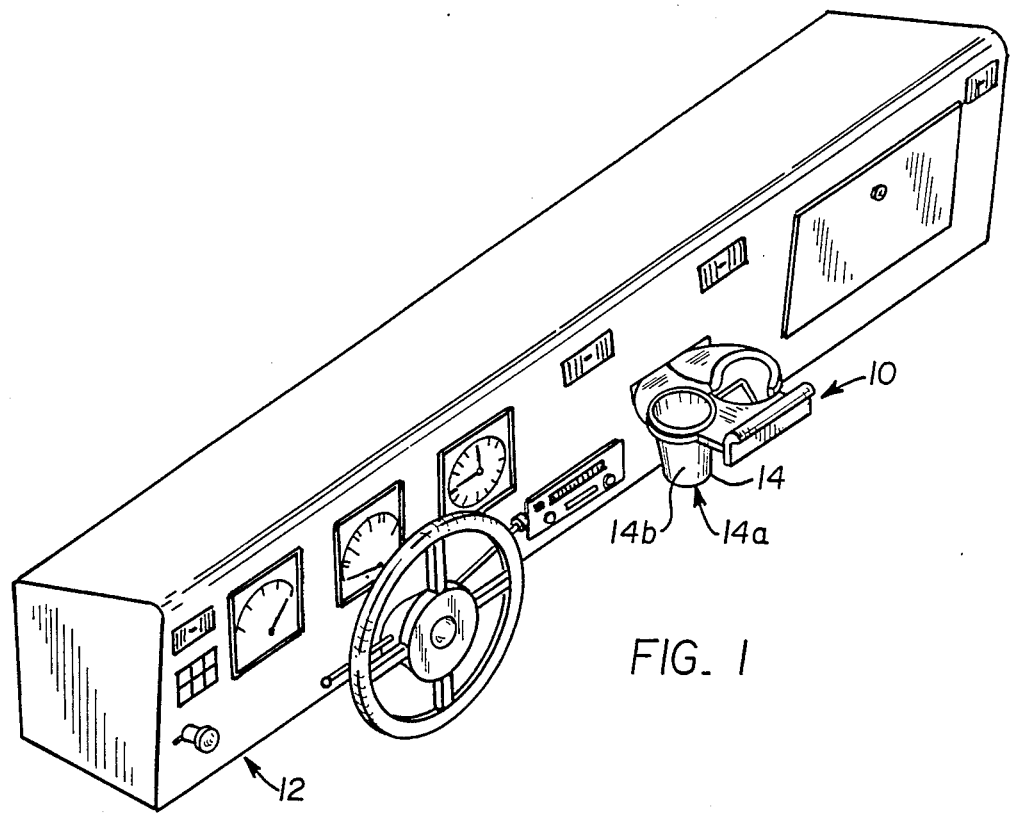
FIG. 1 is a perspective view of an automobile dashboard showing the invention in the form of a cup holder mounted in a recess in the dashboard.
Figure 2:
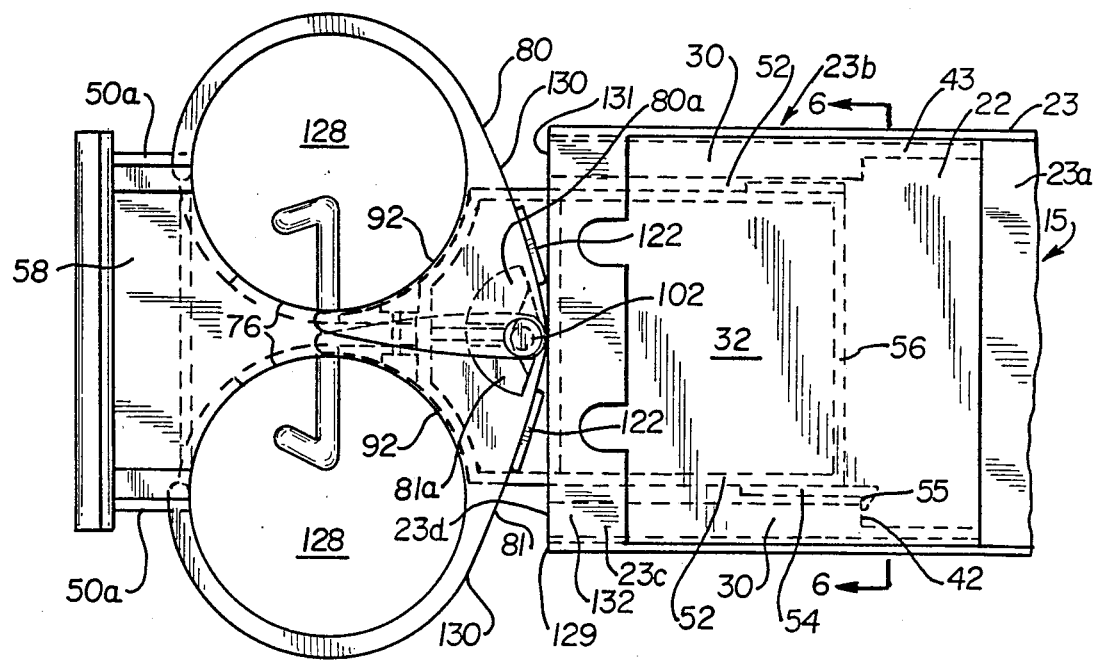
FIG. 2 is a plan view of the cup holder of FIG. 1 in an extended position for use.
Figure 3:
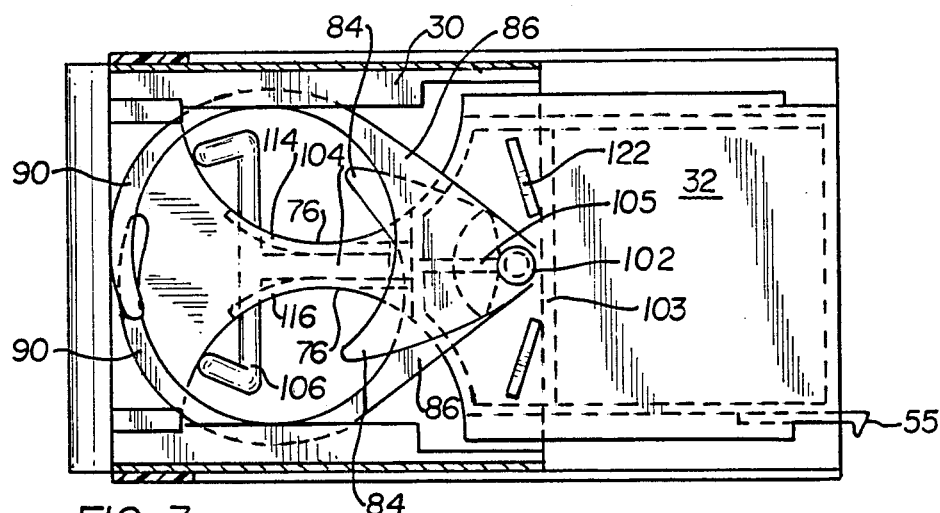
FIG. 3 is a plan view similar to FIG. 2 but showing the cup holder in a retracted position for storage.

Turning now to the drawings, and in particular to FIG. 1, the invention in the form of a cup holder, designated generally as 10, is shown in conjunction with an automobile dashboard 12, it being understood that the dashboard forms no part of the invention in its broader aspects. It will be easily recognized by those skilled in the art that the cup holder 10 may alternatively be secured to an underside of the dashboard 12, mounted in a recess in an automobile door armrest, or secured to an underside of a fold-down armrest/divider as might be used in an automobile having a split bench-style front seat.

Also in FIG. 1 the cup holder 10 is shown to be supporting a beverage container 14 which forms no part of the invention, but which is illustrated in the form of a cup. It will be recognized that beverage containers other than the cup depicted in FIG. 1 may be satisfactorily accommodated by the cup holder 10.

Referring now to FIGS. 2 to 9, the cup holder 10 comprises principally a fixed support means 15, a drawer means 17, and a container retaining means 20. The fixed support means 15 includes a means 16 for mounting the cup holder 10 in a vehicle and a means 18 for supporting the drawer means 17 on the mounting means 16. The mounting means 16 comprises a retainer 22 having a flat base 24 intermediate a pair of vertical side walls 26 formed at lateral edges 28 of the base 24 and maintained in a parallel relation to each other. The retainer 22 may be set into a recess in an automobile dashboard 12 (see FIG. 1) or an automobile door armrest (not shown in the drawings) or it may be secured to an underside of the automobile dashboard 12. Alternatively, it may be secured to the underside of a fold-down armrest/divider of a type commonly used in conjunction with split bench style seating (also not shown in the drawings). The mounting means 16 further includes a shell 23 to cover the retainer 22. The shell 23 is formed with a bottom surface 23a, a pair of parallel side surfaces 23b formed at lateral edges of the bottom surface 23a, and a partial top surface 23c formed at a forward end 23d of the shell 23.

Figure 6:
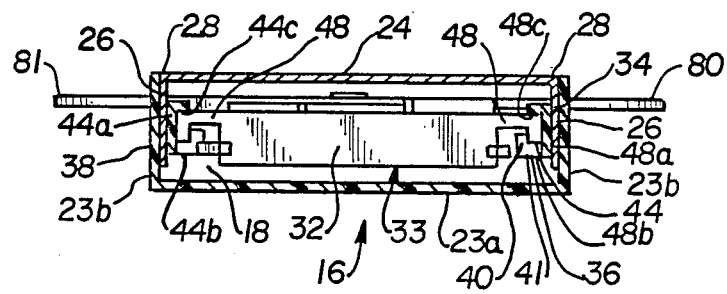
FIG. 6 is a sectional view of the pivoting cup holder taken along lines 6—6 of FIG. 2.

The fixed support means 15 includes means 18 for supporting the drawer means 17 on the mounting means 16 As best shown in FIG. 6, the means 18 for supporting the drawer means 17 comprises a pair of side rails 30. Each side rail 30 is secured to the side walls 26 of the retainer 22 and is formed with a top wall 34, a bottom wall 36 parallel to the top wall 34, and a side wall 38 intermediate the top and bottom walls 34, 36. Each bottom wall 36 is further provided with a lip 40 at a free end 41 of the bottom wall 36, the lip 40 being parallel to the side wall 38. The bottom wall 36 extends the length of the side wall 30 but is of a reduced width at a rear end 43 of the respective side rail 30 thereby creating a ridge 42. The arrangement of each top wall 34, bottom wall 36, side wall 38, and lip 40 provides a channel 44 which extends the length of each side rail 30.

Figure 4:
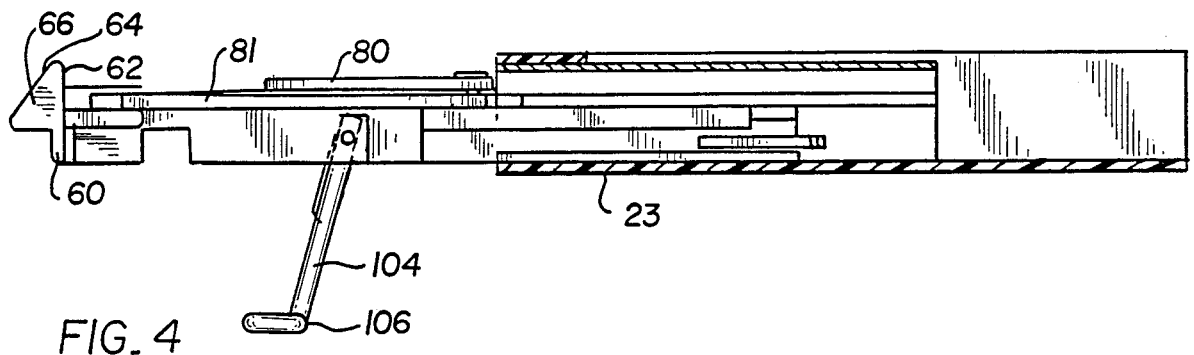
FIG. 4 is an elevational view of the cup holder of FIGS. 1 to 3 in an extended position for use.
Figure 5:
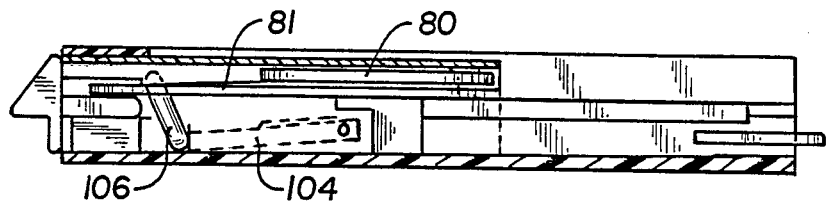
FIG. 5 is an elevational view similar to FIG. 4 but showing the cup holder of FIGS. 1 to 4 in a retracted position for storage.

The drawer means 17 comprises a drawer 32 having a substantially flat horizontal drawer member 46 having parallel downwardly projecting side members 48 formed at opposite sides or opposed lateral edge portions 50 thereof. Also formed in opposite sides 50 of the drawer 32 at an approximately central portion 78 thereof are a pair of adjacent semicircular indentations 76 or first curved edge portions 76. The drawer 32 is further provided with rigidifying and strengthening side ribs 52 formed integral with an underside 33 of the drawer 32 and a stop 54 mounted to the rib 52 at a rear end 56 of the drawer 32. Mounted to a forward end 58 of the drawer 32 is a flange 60 which has formed at an upper portion 62 thereof a handle 64 in the form of a contoured lobe 66. (FIGS. 4 and 5).

Referring again to FIG. 6, each side member 48 of the drawer 32 is received in that channel 44 situated in the respective side rail 30 for sliding movement into and out of the retainer 22. An outside edge 48a, a lower surface 48b, and an upper surface 48c of each side member 48 are in sliding engagement respectively with channel surfaces 44a, 44b, 44c. The stop 54 limits the outward movement of the drawer 32 when a laterally projecting finger 55 formed integrally with the stop 54 engages the ridge 42.

The container retaining means 20 comprises a cup side support means 68, a cup bottom support means 70, and a first and second pivot means 72, 74, respectively for the cup side support means 68 and the cup bottom support means 70.

The cup side support means 68 comprises a pair of first and second cup rings 80, 81. The first pivot means 72 mounts the cup rings 80, 81 to the drawer 32.

Each cup ring 80, 81 is formed with an approximately delta-shaped portion 82, having first, second and third legs 84, 86, 88, and a curved arm section 90. Each cup ring 80, 81, between the first and second legs 84, 86 of the delta shaped portion 82, is provided with a contoured edge 92 having a radius of curvature substantially the same as that of each semicircular indentation 76. Each contoured edge 92 is continuous with an inside edge 94 of the curved arm section 90, which inside edges 94 also have radii of curvature substantially similar to that of each semicircular indentation 76. An aperture 96 is provided in the third leg 86 of each delta shaped portion 82, which apertures 96 cooperate with the first pivot means 72 to rotatably mount the cup rings 80, 81 to the drawer 32, as explained more fully below.

The first pivot means 72 comprises a pivot housing 98, a pivot pin 100 which is in the form of an anvil rivet having a shaft 100a and a head 100b, and a biasing means 102 shown in the form of a torsion spring having a central helical portion 102a and a pair of legs 102b, 102c. The pivot housing 98 is mounted to the underside 33 of the drawer 32 between a transverse rib 103 and a central rib 105 and is provided with an axial bore 98a to receive the pivot pin 100 in a vertical orientation. Alternatively, the pivot housing 98 may be formed integrally with the underside 33 of the drawer 32 at the same location.

In assembly, the cup rings 80, 81 are arranged in an overlapping relationship such that the respective apertures 96 are vertically aligned. The pivot pin 100 registers with the vertically aligned apertures 96 and the axial bore 98a in the pivot housing 98 to mount the cup rings 80, 81 to the drawer 32. The central helical portion 102a of the biasing means 102 is received by the shaft 100a of the pivot pin 100 between the overlapping cup rings 80, 81. The legs 102b, 102c of the biasing means 102 respectively nest within pockets 80a, 81a respectively formed in a lower surface 80b of the third leg 86 of the delta shaped portion 82 of the first cup ring 80 and an upper surface 81b of the third leg 86 of the delta shaped portion 82 of the second cup ring 81.

The cup bottom support means 70 of the container retaining means 20 comprises a bail 104, secured to an end 104a of which, in a plane normal to the bail 104, is an approximately square C-shaped cup supporting member 106. The second pivot means 74 mounts the cup bottom support means 70 to the drawer 32. The second pivot means 74 comprises a pivot 108 in the form of a tubular rivet and a biasing means 110 in the form of a torsion spring having a central circular portion 110a and legs 110b, 110c.

In assembly, a distal end 112 of the bail 104 is received between cup ring ribs 114, 116 formed integral with the underside 33 of the drawer 32. The distal end 112 of the bail 104 is further provided with a transverse bore 118 which is aligned with holes 120 formed in the cup ring ribs 114, 116. The pivot 108 registers with the transverse bore 118 and the holes 120 to mount the cup bottom support means 70 to the drawer 32. The central circular portion 110a of the biasing means 110 is received by the pivot 108 and the legs 110b, 110c of the biasing means 110 respectively engage the bail 104 and the underside 33 of the drawer 32.

In operation, the drawer 32 is slidable between an extended or operative position for use and a retracted position for storage. In the extended position (as best shown in FIGS. 1, 2, 4 and 7), the forward end 58 and the central portion 78 of the drawer 32 project beyond the retainer 22. The biasing means 102 for the first pivot means 72 and the biasing means 110 for the second pivot means 74 respectively allow the cup rings 80, 81 and the cup bottom support means 70 to pivot to their respective container retaining configurations or use positions when the drawer 32 is in the extended position. Each cup ring 80, 81 is adapted to be horizontally rotated, the degree of rotation being limited by stops 122.

In the extended position for use, each contoured edge 92 of the respective delta shaped portion 82 is substantially superimposed over a respective inside edge 124 of the respective semicircular indentation 76. Further, each inside edge 94 of the respective curved arm section 90 is colinear with a respective inside edge 124 of the respective semicircular indentation 76, and a distal end 126 of each curved arm section 90 slightly overlies the drawer 32 where the respective inside edge 124 interrupts a portion 50a of the opposite sides 50 of the drawer 32. In this manner, the cup rings 80, 81 cooperate with the semicircular indentations 76 to provide the cup side support means 68, and complete circular retainers or container-receiving apertures 128, which are dimensioned to receive and accommodate the beverage container 14, which may be of any size typically available to consumers.

Also in the extended position (still referring to FIGS. 1, 2, 4 and 7) the cup bottom support means 70 is vertically rotated such that the bail 104 projects downward and forward and the cup supporting member 106 is centered below the circular retainers 128. In this arrangement, a side wall 14b of the beverage container 14 is laterally supported by the respective complete circular retainer 128 and a bottom surface 14a of the beverage container 14 is braced by the cup supporting member 106.

The drawer 32 is moved to the retracted or stored position (shown in FIGS. 3 and 5) by applying an inwardly directed force to the handle 64 to slidably move the drawer 32 within the channels 4 of the side rails 30 and into the retainer 22 until the flange 60 of the drawer 32 is adjacent to a forward end 129 of the retainer 22.

Adjusting the drawer 32 to the retracted position results in an outside edge or camming surface 130 of each of the second legs 86 of the respective delta shaped portion 82 being engaged by a cam means 131 comprising a forward end 132 of the respective side rail 30. Continued retraction of the drawer 32 thereby causes each cup ring 80, 81 to be rotated in horizontal planes to a collapsed position wherein the cup rings 80, 81 are located between the side rails 30 and to a compact configuration wherein the cup rings 80, 81 are overlapped with respect to each other and with respect to the semicircular indentations 76.

Moving the drawer 32 to the retracted position also results in the bail 104 of the cup bottom support means 70 being engaged by the bottom surface 23a of the shell 23 at the forward end 23d of the shell 23. Continued retraction of the drawer 32 causes the cup bottom support means 70 to be vertically rotated to a location such that the bail 104 is positioned between the cup ring ribs 114, 116 and the cup supporting member 106 projects upward and into the semicircular indentations 76.

Thus, it can be seen that the cup holder 10 provides a compact beverage container holder. Because both the cup side support means 68 and the cup bottom support means 70 are rotatably mounted to the drawer 32, the width of the drawer 32 is considerably less than twice the diameter of two beverage containers and the height of the cup holder 10 is also substantially reduced.

The drawer 32 may be easily moved from the retracted storage position to the extended position by applying an outwardly directed force to the handle 64. As the central portion 78 of the drawer 32 is drawn beyond the side rails 30, the cup rings 80, 81 and the cup bottom support means 70 will be rotated under the urging of the biasing means 102, 110 to assume the positions described above and shown in FIGS. 1, 2, 4 and 7.

While the invention has been described in connection with a preferred embodiment, it will be understood that the invention is not intended to be limited to that embodiment. On the contrary, all alternatives, modifications and equivalents as may be included within the spirit and scope of the invention as defined by the appended claims is intended.

What is claimed is:

1. A cup holder for supporting at least one beverage container in a vehicle, comprising a drawer member, fixed support means therefor, and container retaining means carried by the drawer member, the fixed support means including means for mounting the holder in a vehicle, and means supporting the drawer member on the mounting means for reciprocating movement relative to the mounting means between an operative position extending outwardly of the mounting means and a storage position extending inwardly relative to the mounting means, the container retaining means being mounted to the drawer member for pivotal movement therewith about a vertical axis relative to the fixed support means and for movement relative to the drawer member between a retaining position forming therewith a container retaining configuration and a collapsed position forming with the drawer member a compact configuration occupying a space smaller than the space occupied by the container retaining configuration, the cup holder further comprising means carried by the drawer member biasing the container retaining means toward the retaining position, the fixed means including cam means engaged with the container retaining means to urge the container retaining means to the collapsed position upon movement of the drawer member from the operative position to the storage position, the drawer member comprising a substantially flat horizontal member formed with a first curved edge portion, the container retaining means comprising a cup ring and means mounting the cup ring on the drawer member for pivotal movement relative thereto about a vertical axis between the retaining position and the collapsed position, the cup ring being formed with a second curved edge portion complementary to the first curved edge portion to define therewith a container receiving aperture when the cup ring is in the retaining position, the biasing means comprising a spring interposed between the drawer member and the cup ring.

2. A cup holder according to claim 1, the drawer member further comprising an undersurface, the container receiving means further comprising a bail, and means mounting the bail on the undersurface of the drawer member for pivotal movement relative thereto about a horizontal axis between the retaining position and the collapsed position, the bail being disposed in the retaining position to support the bottom of a container received by the drawer member, the biasing means comprising a spring interposed between the drawer member and the bail.

3. A cup holder for supporting at least one beverage container in a vehicle, comprising a drawer member, fixed support means therefor, and container retaining means carried by the drawer member, the fixed support means including means for mounting the holder in a vehicle, and means supporting the drawer member on the mounting means for reciprocating movement relative to the mounting means between an operative position extending outwardly of the mounting means and a storage position extending inwardly relative to the mounting means, the container retaining means being mounted to the drawer member for pivotal movement therewith about a vertical axis relative to the fixed support means and for movement relative to the drawer member between a retaining position forming therewith a container retaining configuration and a collapsed position forming with the drawer member a compact configuration occupying a space smaller than the space occupied by the container retaining configuration, the cup holder further comprising means carried by the drawer member biasing the container retaining means toward the retaining position, the fixed means including cam means engageable with the container retaining means to urge the container retaining means to the collapsed position upon movement of the drawer member from the operative position to the storage position wherein the drawer member comprises a substantially flat horizontal member formed with a pair of curved indentations at opposed lateral edge portions thereof, the container retaining means comprising a pair of cup rings and means mounting thereto in opposite directions and in horizontal planes between the retaining position and the collapsed position, each of the cup rings being formed with a curved edge complementary to one of the indentations whereby to define therewith a container-receiving aperture when the cup rings are in the retaining position, the biasing means comprising spring means interposed between the drawer member and each of the cup rings.

4. A cup holder according to claim 3, wherein each of the cup rings is formed with a pivot aperture, the cup rings being partially overlapped with the pivot apertures thereof aligned to receive the means mounting the cup rings on the drawer member, whereby the pivotal movement of the cup rings is executed about a single vertical axis common to thereto.

5. A cup holder according to claim 3, wherein the spring means comprises a single torsion spring interposed between each of the cup rings and the drawer member.

6. A cup holder according to claim 4, wherein the drawer member has opposed upper and lower surfaces, the cup rings being disposed at the upper surface, the container retaining means further comprising a bail and means mounting the bail on the lower surface for pivotal movement relative to the drawer member about a horizontal axis between the retaining position and the collapsed position, the bail being disposed in the retaining position to support the bottom of a beverage container received in either of the container-receiving apertures, and second biasing means including a torsion spring interposed between the drawer member and the bail for biasing the bail to the retaining position.

7. A cup holder for supporting a pair of beverage containers, comprising a fixed support for mounting the holder in a vehicle, a drawer having opposite lateral edges, the drawer being received in the support for reciprocating movement between an open position in which it extends outwardly from the support and a closed position in which it is substantially enclosed within the support, a pair of cup rings mounted on the drawer for movement therewith relative to the support and for movement relative to the drawer between an expanded position in which the cup rings extend outwardly of the drawer beyond the opposite lateral edges thereof and a retracted position in which the cup rings lie entirely within the opposite lateral edges, the cup rings and the opposite lateral edges having complementary configurations whereby each of the cup rings in the expanded position defines a circular container-receiving aperture with the respective lateral edge of the drawer, means carried on the drawer for urging the cup rings to the expanded position, and cam means provided on the fixed support and comprising means engageable with the cup rings as the drawer is moved to the closed position to urge the cup rings to the retracted position.

8. A cup holder according to claim 7, including a container support member mounted on the drawer for movement therewith relative to the fixed support and for movement relative thereto between a support position extending downwardly from the drawer and a folded position lying against the drawer, the container support member being disposed in the support position to engage the bottom of a beverage container received in one of the container-receiving apertures in supporting relation thereto, and means carried on the drawer for urging the container support member to the support position, the cam means including means engageable with the container support member as the drawer is moved to the closed position to urge the container support member to the folded position.

9. A cup holder for supporting at least one beverage container in a vehicle, comprising a drawer member, fixed support means therefor, and container retaining means carried by the drawer member on the mounting means for reciprocating movement relative to the mounting means between an operative position extending outwardly of the mounting means and a storage position extending inwardly relative to the mounting means, the container retaining means being mounted to the drawer member for pivotal movement therewith about a vertical axis relative to the fixed support means and for movement relative to the drawer member between a retaining position forming therewith a container retaining configuration and a collapsed position forming with the drawer member a compact configuration occupying a space smaller than the space occupied by the container retaining configuration, the cup holder further comprising means carried by the drawer member biasing the container retaining means toward the retaining position, the fixed means including cam means engageable with the container retaining means to urge the container retaining means to the collapsed position upon movement of the drawer member from the operative position to the storage position, wherein the container retaining means comprises a partial ring which cooperates with the drawer member to define the container retaining configuration when the container retaining means is in the retaining position.

10. A cup holder according to claim 9 wherein the drawer member comprises a substantially flat horizontal member formed with a first curved edge portion which cooperates with the partial ring to define the container retaining configuration when the container retaining means is in the retaining position.

11. A cup holder according to claim 10, wherein the drawer member includes an undersurface and the container retaining means further comprises a bail, and means mounting the bail on the undersurface of the drawer member for pivotal movement relative thereto about a horizontal axis between the retaining position and the collapsed position, the bail being disposed in the retaining position to support the bottom of a container received by the drawer member.

12. A cup holder according to claim 11, wherein the biasing means comprises a spring interposed between the drawer member and the bail.

* * * * *

UNITED STATES PATENT AND TRADEMARK OFFICE
CERTIFICATE OF CORRECTION

PATENT NO. : 4,953,771

DATED : September 4, 1990

INVENTOR(S) : DOUGLAS A. FISCHER et al.

It is certified that error appears in the above-identified patent and that said Letters Patent is hereby corrected as shown below:

Claim 1, column 7, line 67, "engaged" should be --engageable--.

Claim 3, column 8, line 56, after "mounting" insert --the cup rings on the drawer member for pivotal movement relative--.

Claim 6, column 9, line 8, "4" should be --3--.

Signed and Sealed this

Seventh Day of April, 1992

Attest:

HARRY F. MANBECK, JR.

Attesting Officer

Commissioner of Patents and Trademarks